United States Patent
Shao et al.

(10) Patent No.: US 7,325,073 B2
(45) Date of Patent: Jan. 29, 2008

(54) PEER TO PEER VIDEO ON DEMAND SYSTEM SELECTIVELY USING CLIENT AND SERVER TO FORWARD THE REQUESTED VIDEO PROGRAM TO ANOTHER CLIENT

(75) Inventors: Ling Shao, Beijing (CN); Guo Hui Lin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 10/454,701

(22) Filed: Jun. 4, 2003

(65) Prior Publication Data

US 2004/0015995 A1 Jan. 22, 2004

(30) Foreign Application Priority Data

Jun. 28, 2002 (CN) .............................. 02 1 25132

(51) Int. Cl.
G06F 15/173 (2006.01)
G06F 15/16 (2006.01)

(52) U.S. Cl. ........................ 709/238; 709/239; 709/217

(58) Field of Classification Search ................ 709/238, 709/239, 217, 203, 219; 725/32, 87; 370/467
See application file for complete search history.

(56) References Cited

U.S. PATENT DOCUMENTS

| 5,884,031 A * | 3/1999 | Ice .............................. 709/203 |
| 5,915,094 A * | 6/1999 | Kouloheris et al. ......... 709/219 |
| 5,956,716 A | 9/1999 | Kenner et al. |
| 5,963,553 A | 10/1999 | Wicklund |
| 5,978,567 A * | 11/1999 | Rebane et al. ............... 709/219 |
| 6,018,359 A | 1/2000 | Kermode et al. |
| 6,049,823 A | 4/2000 | Hwang |
| 6,185,209 B1 | 2/2001 | Wicklund |
| 6,269,394 B1 | 7/2001 | Kenner et al. |
| 7,158,534 B2 * | 1/2007 | Tam et al. ................... 370/467 |
| 2001/0003188 A1 * | 6/2001 | Kikinis ........................ 709/203 |
| 2002/0108109 A1 * | 8/2002 | Harris et al. ................... 725/32 |
| 2004/0015995 A1 * | 1/2004 | Shao et al. .................... 725/87 |

FOREIGN PATENT DOCUMENTS

WO    WO 01/10125 A1    2/2001

* cited by examiner

Primary Examiner—Le Hien Luu
(74) Attorney, Agent, or Firm—Scully, Scott, Murphy & Presser, P.C.; Lisa M. Yamonaco

(57) ABSTRACT

Video On Demand system providing video programs between a program provider and a plurality of clients coupled over a peer to peer network. Transmitting a requested video program from a first client on a first channel. Allocating a second channel for transmitting the video program requested by a second client. The first client forwarding the video program to the second client on the second channel from the beginning of the video program received and stored. Controlling the second client to receive and store the video program sent on the first channel in synchronization with the first client. Merging the second channel into the first channel in response to notification that the program received from the first client by the second client reaches a starting point of the program received and stored by the second client. Notifying the first client to stop sending the video program to the second client.

10 Claims, 3 Drawing Sheets

PEER TO PEER VIDEO ON DEMAND SYSTEM SELECTIVELY USING CLIENT AND SERVER TO FORWARD THE REQUESTED VIDEO PROGRAM TO ANOTHER CLIENT

FIELD OF INVENTION

The invention relates to a Video-On-Demand (VOD) system and method, more particularly to a true Video-On-Demand (VOD) system and method in a peer to peer network.

BACKGROUND OF THE INVENTION

In an ideal VOD system or general Media-On-Demand system, end-users may choose to play their own favorite program at whatever time they like and can conduct pausing, playing forward, playing backward as easily as control of a VCR. However, in a conventional VOD system, all streams are transmitted from the video service providing apparatus. In consideration that such requirement imposes a very heavy burden on the server and network bandwidth, a typical video program has the size of several gigabytes and a common Media-On-Demand system should serve thousands of people simultaneously. How to deliver these programs to end-users at their wishes and keep the expense of servers and network as low as possible is the crucial problem in a Media-On-Demand system.

Many methods have been proposed in order to solve the problem. These range, from the early batch policy to the later skyscraper and hierarchy merging algorithm, which considerably reduce workload of the server and network bandwidth. However, even the latest method still requires the server to possess tremendous throughput which exceeds the capacity of a general-purpose server.

A VOD delivery system and method is disclosed in the U.S. Pat. No. 6,018,359, the method uses a static merging algorithm and multicast technique to transmit video data from a server to clients, wherein the clients are required to receive at least two channels at the same time and adjust their receiving channel according to the predefined pattern. However, the technical solution disclosed in the patent has two shortcomings:

1. The server must multicast the same video program repeatedly to the clients, no matter whether there is any receiver, thus resulting in fixed overhead of the server and the network. Therefore, even if the video program is not a quite popular one and is not viewed by many viewers, the server must still multicast the same program repeatedly, thus resulting in a tremendous waste of resources.
2. All the video program streams are sent from the server without considering that the clients may share some workload for the server, thereby resulting in over heavy workload of the server.

SUMMARY OF THE INVENTION

In order to solve the problem, there is provided a peer to peer video-on-demand (VOD) system, in which the clients are able to share some workload and network bandwidth for a server, only a root stream is sent from the server, and the catching up streams are sent from one of those clients who appears before a new client in the pre-order merging tree.

According to the above, the invention provides a method used in a peer to peer VOD system for providing video programs among a video program providing apparatus and a plurality of clients which are connected through a peer to peer network. An example method comprises the steps of:

(1) in response to a request for a video program from a first client (A) among the plurality of clients, transmitting the requested video program to the first client on a first channel;

(2) in response to a request for the same video program from a second client (B) among the plurality of clients, allocating a second channel for transmitting video program;

(3) notifying the first client (A) which receives the same video program on the first channel prior to the second client (B), to forward the video program to the second client (B) on the second channel from the beginning (a) of the video program which has been received from the video program providing apparatus and stored by the first client (A);

(4) controlling the second client (B) to receive and store the video program transmitted from the video program providing apparatus on the first channel in synchronization with the first client (A);

(5) in response to a notification that the video program received from the first client (A) by the second client (B) reaches a starting point (b) of the program which was received from the video program providing apparatus and stored by the second client (B), merging the second channel into the first channel, and notifying the first client (A) to stop forwarding the video program to the second client (B).

The method further comprises the step of:

(6) in response to the merging of the second channel and the first channel, while continuing receiving and storing the succeeding video program transmitted from the video program providing apparatus on the first channel, the second client (B) reading and playing the stored video program in FIFO (first in first out) manner to ensure the continuity of the video program being played on the second client (B).

The invention also provides a video program providing apparatus in a peer to peer VOD system, connected to a plurality of clients through a peer to peer network, the video program providing apparatus comprising:

transmitting means, in response to a request for a video program from a first client (A) among the plurality of clients, for transmitting the requested video program to the first client on a first channel;

channel allocating means, in response to a request for the same video program from a second client (B) among the plurality of clients, for allocating a second channel for transmitting the video program;

forwarding designation means, in response to the request for the video program from the second client (B), for notifying the first client (A) which receives the same video program on the first channel prior to the second client (B) to forward the video program to the second client (B) on the second channel from the beginning (a) of the video program which has been received from the video program providing apparatus and stored by the first client (A), and for controlling the second client (B) to receive and store the video program transmitted from the video program providing apparatus on the first channel in synchronization with the first client (A); wherein, in response to a notification that the video program received from the first client (A) by the second client (B) reaches a starting point (b) of the program which was received and stored by the second client (B) from the video program providing apparatus, the channel allocating means merges the second channel into the first channel, and the forwarding designation means notifies the first client (A) to stop forwarding the video program to the second client (B).

The invention further provides a peer to peer VOD system, comprising a video program providing apparatus and a plurality of clients which are connected through a peer to peer network, wherein: each of the clients comprising: storing unit for storing a video program received from the video program providing apparatus by the client; and forwarding unit for forwarding the video program to other clients; the video program providing apparatus comprising: transmitting means, in response to a request for a video program from a first client (A) among the clients, for transmitting the requested video program to the first client on a first channel; channel allocating means, in response to a request for the same video program from a second client (B) among the plurality of clients, for allocating a second channel for transmitting the video program; forwarding designation means, in response to the request for the video program from the second client (B), for notifying the first client (A) which receives the same video program on the first channel before the second client (B) to forward the video program to the second client on the second channel from the beginning (a) of the video program which has been received from the video program providing apparatus and stored by the first client (A), and for controlling the second client (B) to receive and store the video program transmitted from the video program providing apparatus on the first channel in synchronization with the first client (A); wherein, in response to a notification that the video program received from the first client (A) by the second client (B) reaches a starting point (b) of the program which was received and stored by the second client (B) from the video program providing apparatus, the channel assigning means merges the second channel into the first channel, and the forwarding designation means notifies the first client (A) to stop sending the video program to the second client (B).

The invention still further provides a method of forwarding a video program received from a video program providing apparatus, wherein the method comprising:
receiving a requested video program on a first channel;
storing the received video program; and forwarding the stored video program to another client on a second channel in accordance with a control signal from the video program providing apparatus.

Along with the rapid development of computer technology, the strong processing capacity of current personal computers (PCs) and the application of a broadband network make it possible to share some workload for the server. Therefore the invention can be implemented using latest hierarchy (dynamic) merging algorithm, point to point scheme, multicast network infrastructure and client PCs with strong capacity, the transmission capacity of system data can be extended greatly without bringing a lot of workload to the server, and save the network bandwidth.

BRIEF DESCRIPTION OF THE DRAWINGS

The above and other objects, features, and advantages of the present invention will become more apparent from the following detailed description in conjunction with the accompanying drawings, in which.

NUMERAL REFERENCES

Figure 1:
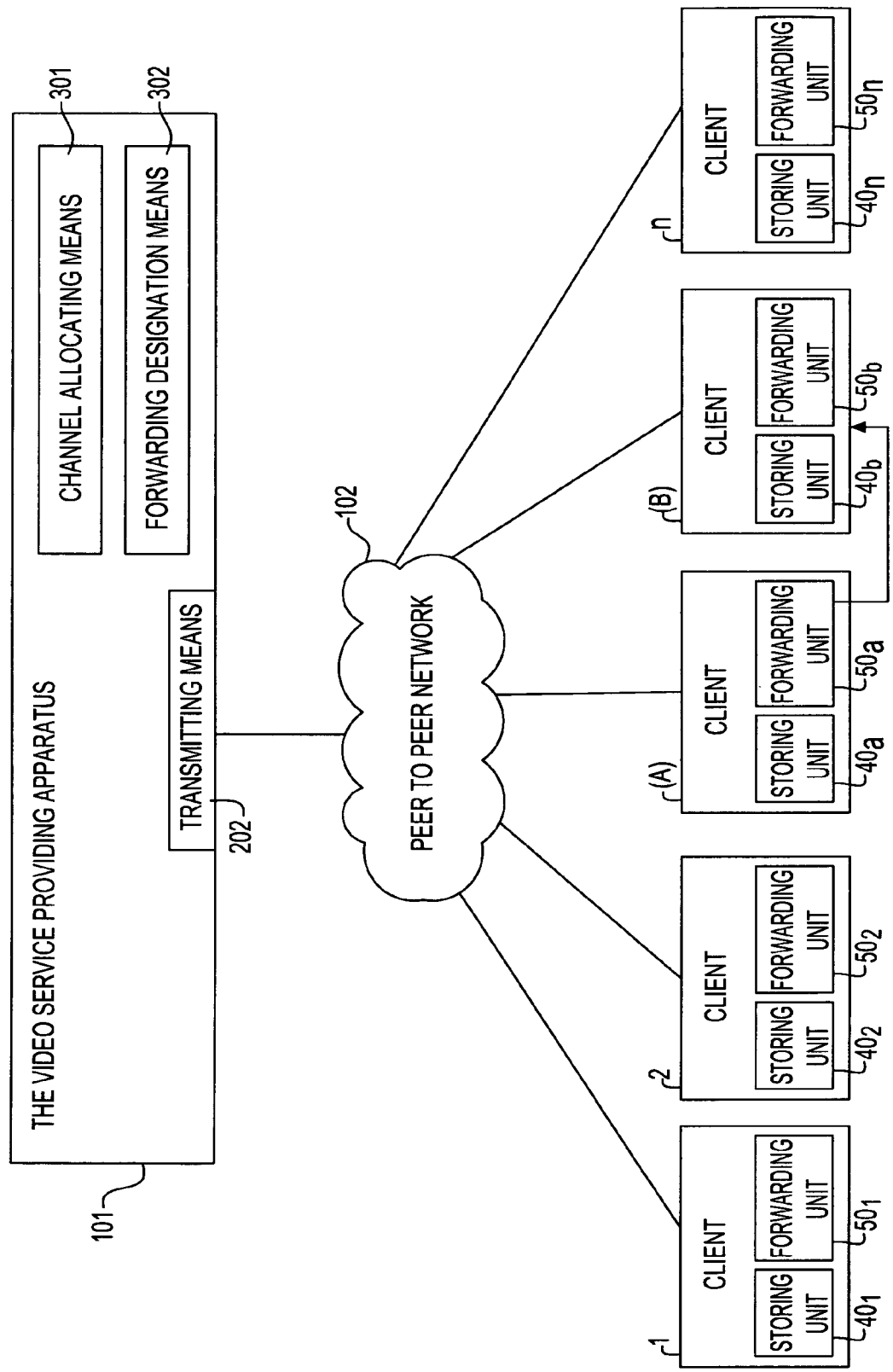
FIG. 1 is a schematic diagram of an example embodiment of the structure of the system according to the invention.
Figure 2:
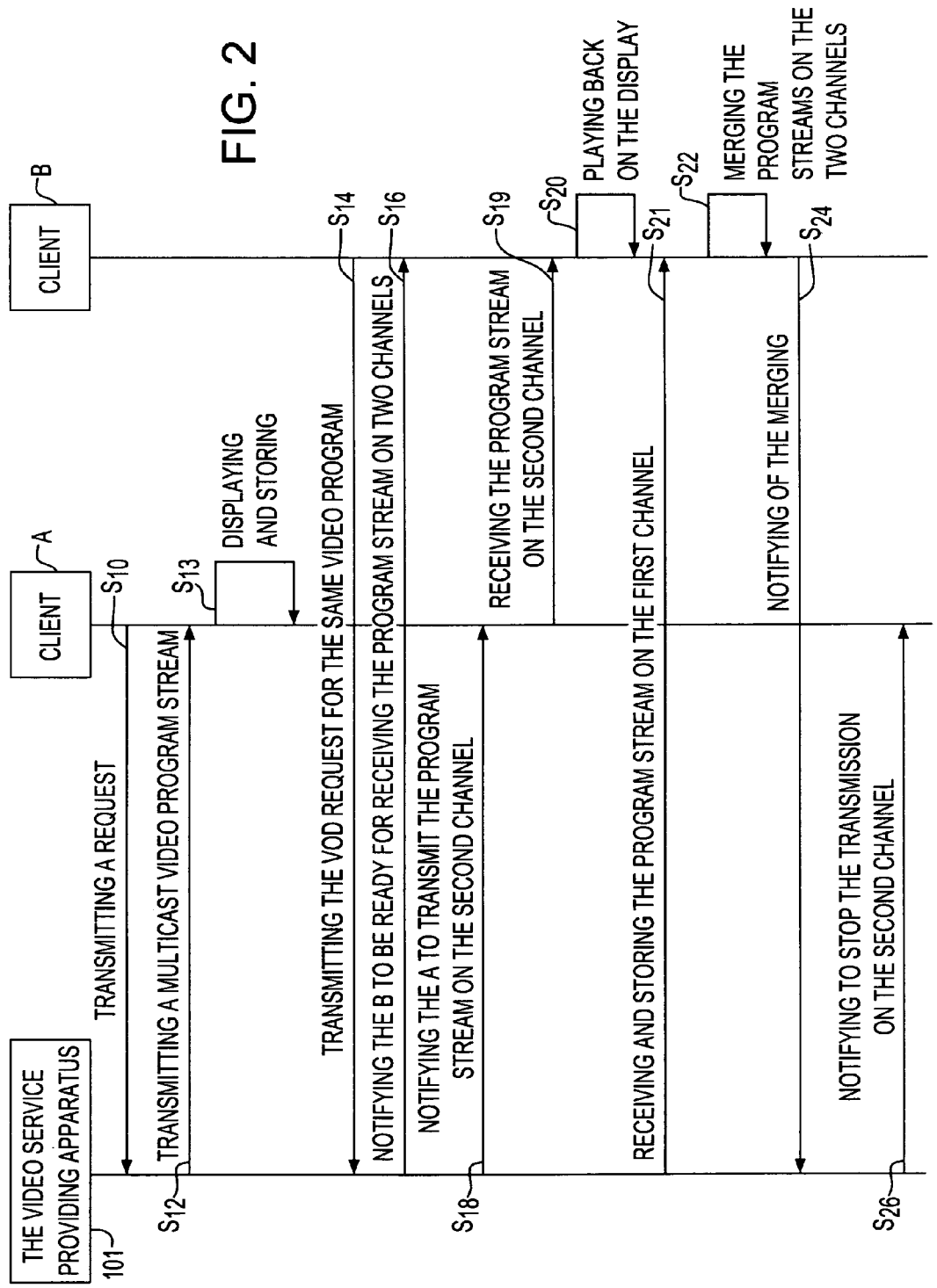
FIG. 2 is a flow chart of a method according to an embodiment of the invention.

FIG. 1
  101 the video service providing apparatus
  102 peer to peer network
  202 transmitting means
  301 channel allocating means
  302 forwarding designation means client storing unit forwarding unit FIG. 2
  S10 transmitting a request
  S12 transmitting a multicast video program stream
  S13 displaying and storing
  S14 transmitting the VOD request for the same video program
  S16 notifying the B to be ready for receiving the program stream on two channels
  S18 notifying the A to transmit the program stream on the second channel
  S20 playing back on the display
  S21 receiving and storing the program stream on the first channel
  S22 merging the program streams on the two channels
  S24 notifying of the merging
  S26 notifying to stop the transmission on the second channel

DESCRIPTION OF THE INVENTION

The invention will be described in detail with reference to the drawings and specific embodiments. FIG. 1 is a schematic diagram of an embodiment of the structure of the system according to the invention. As shown in FIG. 1, the video service providing apparatus 101 is connected to clients (1-N) through a network 102, forming a peer to peer network, wherein the video service providing apparatus 101 comprises: control means (not shown), which can be the CPU in a server or other processor, for executing corresponding programs, and controlling the video service providing apparatus 101 to execute various functions; transmitting means 202, in response to the VOD requests from various clients (1-N), for transmitting the requested video programs; channel allocating means 301 for allocating the channels for transmitting video programs among the video service providing apparatus 101 and the clients 1-N upon receiving a VOD request from one of the clients; and forwarding designation means 302, upon receiving from a second client the same VOD request as that of a first client, for notifying the first client to forward the video program to the second client.

The video service providing apparatus can also comprise a client software downloading unit (not shown) for providing a downloadable client program to a client to allow the client to execute the forwarding operation of the video program. The video service providing apparatus 101 can be a VOD server. The video program can be entertainment programs including image and voice, such as movies and TV programs, it can also be multimedia materials used in various fields, including image, text and voice or only text or image or voice.

Each of clients (1-N) has its respective storing units $40_1$, $40_2$, ..., or $40_n$ for storing the video program received by the client from the video service providing apparatus 101, and forwarding unit $50_1$, $50_2$, ..., or $50_n$ for forwarding the video program stored in the storing unit of the client to other clients.

In the system according to the present invention, the peer to peer network environment is necessary. In the meantime, all of the program streams are multicast streams which are transmitted from the transmitting means 202 of the video service providing apparatus 101 in response to the request of each client, and can be received by all the clients (1-N). In order to relieve the workloads of the clients (1-N), each client (1-N) not only, according to the hierarchy (dynamic) merging algorithm, receives two multicast streams from the service providing apparatus and the client appeared before it that requests the same video program respectively, but also transmits one multicast stream having been received and stored in a local disk.

In this system, the video service providing apparatus 101 is responsible for receiving all the requests of clients, and then constructing a hierarchy merging tree. If the request is the first one for the program, then it is arranged to transmit multicast stream from the video service providing apparatus 101. Forwarding designation means 302 is responsible for arranging the client which previously transmitted the request to deliver a multicast stream to the new requester, and if unnecessary, notifying the client which is delivering multicast streams to other clients to stop the transmission.

FIG. 2 is a flow chart of a method according to the invention, which illustrates the operation flow of the transmission and reception of video program among the video service providing apparatus 101, a client A and another client B shown in FIG. 1, in which the client A is the one which first requests a piece of video program from the video service providing apparatus 101, and the client B is the one which requests the same video program from the video service providing apparatus 101 after a period of time T since the client A transmits the request.

Figure 3:
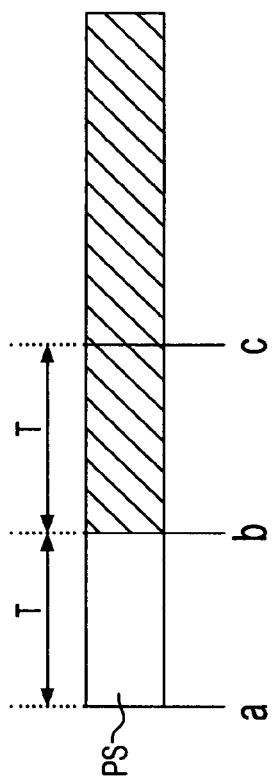
FIG. 3 is a view of the program stream (PS) according to an embodiment of the invention.
Figure 4:
FIG. 4 is a schematic diagram illustrating the hierarchy tree with two client nodes according to an embodiment of the invention.

As shown in FIG. 2, at step S10, the client A first requests the video service providing apparatus 101 to transmit a video program to it. At step S12, upon receiving the request transmitted by the client A, the video service providing apparatus 101 finds that the client A is the first one to request the program, then under the control of control means (not shown), channel allocating means 301 arranges a free multicast channel (a first channel) to transmit the program to the client A from the starting point of the requested video program (point a in the program stream (PS) as shown in FIG. 3) through the transmitting means 202. At step S13, the client A receives the video program transmitted from the video service providing apparatus 101, and plays it back on its display (not shown) and stores it in storing unit 40. At step S14, after the period of time T, the client B transmits to the video service providing apparatus 101 a request for the same video program as that requested by the client A. At step S16, upon receiving the request from the client B, the video service providing apparatus 101 constructs a merging tree as shown in FIG. 4 (in which there are only two client nodes, A and B), and determines that the request is from the client B after a period of time T since the client A transmits the same request, and then transmits a notification to the client B, requesting it to be ready for receiving the video program on both the used multicast channel (the first channel) and another new multicast channel (a second channel), which are allocated by channel allocating means 301. The contents of the notification includes the following information: main channel (i.e., the first channel) number, forwarding channel (i.e., the second channel) number, forwarding client ID (i.e. the client A), receiving client (i.e., the client B) ID, video program ID and so on.

At the same time, at step S18, the forwarding designation means 302 of the video service providing apparatus 101 transmits to the client A a forwarding notification, requesting it to transmit, through the second channel, to the client B the video program that it received from the video service providing apparatus 101 through the first channel and stored in the storing unit 40*a* in the client A. The contents of the notification includes the following information: main channel (i.e., the first channel) number, forwarding channel (i.e., the second channel) number, forwarding side client (i.e. the client A) ID, receiving side client (i.e., the client B) ID, video program ID and so on. At step S19, the client A conducts the transmission according to the notification of the forwarding designation means 302. At step S20, the client B, in the meantime when receiving the video program, plays back the received video program from the starting point (point a in the program stream (PS) as shown in FIG. 3) of the video program on its display unit (not shown).

In the meantime, at step S21, the client B, in synchronization with the client A, receives the video program from transmitting means 202 of the video service providing apparatus 101, on the first channel used by the client A previously, and stores the video program in its storing unit 40*a*, wherein the starting point of the video program received by the client B from the video service providing apparatus 101 is point b of the program stream TS as shown in FIG. 3, i.e., the position where the program stream TS has been played back for a period of time, T.

After the same period of time T again, at step S22, the client B finds that the video program received from the client A on the second channel (the forwarding channel) and played back by itself has reached to the starting point (point b in program stream (PS) as shown in FIG. 3) of the video program received from the video service providing apparatus 101 on the first channel (main channel), i.e., the video program received from the client A on the second channel and played back by the client B has caught up with the one received from the video service providing apparatus 101 on the first channel.

At this time, the video program transmitted by the video service providing apparatus 101 has reached to point c of the program TS as shown in FIG. 3, and the client B reads the video stream TS stored in its storing unit from point b and plays it back, while continuing to receive and store the video program from the video service providing apparatus 101 on the first channel. At this time, the client B no longer plays back the video program received from the client A. That is, the above operation are as follows: the client B reads the video program from storing unit 40*a* at the point b as shown in FIG. 3 and plays it back, following the video program received from the client A and played by itself, meantime the client B still continues to receive the video program from the video service providing apparatus 101 at point c on the first channel, and store it. That is, a piece of the video program corresponding to a period of time, T, is dynamically stored in storing unit 40*a* of the client B all the time, and the piece of video program is read and played back on a display (not shown) by the client B according to a first-in-first-out principle, thereby obtaining the effect of merging the second channel used by the client B into the first channel used by the client A. That is, node B is merged in node A as shown in FIG. 4. Thus, the client B and the client A will use the same transmission channel to receive the same video program from the video service providing apparatus 101, and the video service providing apparatus 101 needs not occupy additional network bandwidth for providing an individual transmission channel for the client B.

After the merging of the two channels, at step S24, the client B notifies the result of the merging of the two channels to the video service providing apparatus 101. Finally, at step S26, the forwarding designation means 302 of the video service providing apparatus 101 notifies the client A to stop transmitting the video program to the client B on the second channel.

In the above cases, if more than two clients among the clients (1-N) request the same video program from the video service providing apparatus 101, then the hierarchy merging will happen. Each client therein is ready for receiving two program streams simultaneously and transmitting to another client joining lately the video program having been received and stored in its local disk, and the two program streams received by the client will be merged into its parent node appeared in the merging tree. Of course, it is not always the case that the parent node delivers to all its children node the catching up stream, every client could be a catching up stream provider candidate for those clients who appeared later in the merging tree. If the clients that can be used are more than one, then it should be the video service providing apparatus 101 that determines which client delivers the catching up stream to a new client.

If a group of clients can be merged into a root node, then the server only needs to serve the video data of a root node channel, and other channels can be served by the client receiving the video program beforehand. The scheme of the present invention not only saves the network overhead, but also greatly relieve the workload of the server. The server can also find the failure of the clients who are providing a service and adjust the channel allocation in real time.

Figure 5:
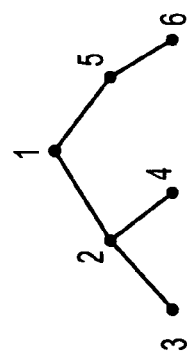
FIG. 5 is a schematic diagram illustrating the hierarchy tree with multiple client nodes according to an embodiment of the invention.

FIG. 5 is a schematic diagram illustrating the hierarchy tree with multiple client nodes. As shown in FIG. 5, the number 1, 2, . . . , 6 denote different clients, which transmit the requests for the same video program to the video service providing apparatus 101, wherein the order indicated by the numbers is arranged according to the time order that the requests transmitted by them reached to the video service providing apparatus 101. Root node 1 denotes the client that first transmits the request, whereas node 6 is the last client that transmits the request. In the merging tree, each client (each node) except the root node catches up with its parent node by receiving a multicast stream pointed to itself and receiving a multicast stream pointed to its parent node. After catching up with its parent node (node 2 shown in FIG. 5), the child node (node 4 shown in FIG. 5) will be merged into the parent node (i.e. node 2). The merging process continues until all the nodes are merged into the root node. Of course, this is the ideal case based on the assumption that the video program is infinitely long. In practical situations, such kind of complete merging can not happen. But the merging practically happening can also greatly relieve the burden of the video service providing apparatus 101 and the network bandwidth.

In practical applications, the client with forwarding function can also adopts one or more secondary video servers. If the forwarding is done by the client of a user, then the video server of the present invention sets a client side software downloading unit for the client to download and install the user side program for forwarding, so as to set up the forwarding function for the client.

Though the merging algorithm adopted before (static merging algorithm) itself relieves the workload of the server and saves the network bandwidth, in the system adopting this kind of static merging algorithm one typical 100 minutes video stream with waiting time being no more than one minute will still require almost 9 channels in the busiest situation. If the video service providing apparatus delivers 20 different MPEG-2 program streams with an average bit rate 3 Mb/s of each of them simultaneously, then it will require the video service providing apparatus has a throughout capability as much as 540 Mb/s. While in the present system, the video service providing apparatus does not have to serve all the 9 channels and there is no need to be equipped with the video service providing apparatus with strong functions but too more expenses, because most of the workload has been shifted to other clients who have stored part of demanded contents.

While the invention has been shown and described with reference to a certain embodiment thereof, it will be understood by those skilled in the art that various changes may be made therein without departing from the spirit and scope of the invention as defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above.

The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method used in a peer to peer video-on-demand system for providing video programs among a video program providing apparatus and a plurality of clients which are connected through a peer to peer network, said method comprising the steps of:
   (a) in response to a request for a video program from a first client among said plurality of clients, transmitting the requested video program to said first client on a first channel;
   (b) in response to a request for the same video program from a second client among said plurality of clients, allocating a second channel for transmitting video program;
   (c) notifying said first client which receives the same video program on said first channel prior to said second client, to forward said video program to said second client on said second channel from the beginning of said video program which has been received from the video program providing apparatus and stored by said first client;
   (d) controlling said second client to receive and store the said video program transmitted from the video program providing apparatus on said first channel in synchronization with said first client;
   (e) in response to a notification that the video program received from said first client by said second client reaches a starting point of the program which was received from the video program providing apparatus and stored by said second client, merging said second channel into said first channel, and notifying said first client to stop forwarding said video program to said second client.

2. The method as set forth in claim 1, further comprising the step of:
   (f) in response to the merging of said second channel and said first channel, while continuing receiving and storing the succeeding video program transmitted from said video program providing apparatus on said first channel, said second client reading and playing said stored video program in first-in-first-out manner to ensure the continuity of the video program being played on said second client.

3. The method as set forth in claim 1 or 2, wherein said video program providing apparatus is a video server.

4. The method as set forth in claim 1, wherein said clients are secondary video servers in the peer to peer network.

5. The method as set forth in claim 1, wherein said video program comprises multimedia contents.

6. The method as set forth in claim 1, wherein any one of the clients requesting the video program providing apparatus for the same video program before said second client plays the role of said first client.

7. The method as set forth in claim 1, wherein said first channel and second channel are multicast channels.

8. The method as set forth in claim 1, wherein that said video program providing apparatus further comprises a client software downloading unit for providing a client software which can be downloaded by said clients to perform forwarding of the video program.

9. An article of manufacture comprising a computer usable medium having computer readable program code means embodied therein for causing provision of video programs, the computer readable program code means in said article of manufacture comprising computer readable program code means for causing a computer to effect the steps of claim 1.

10. A program storage device readable by machine, tangibly embodying a program of instructions executable by the machine to perform method steps for causing provision of video programs, said method steps comprising the steps of claim 1.

* * * * *